US012368933B1

(12) United States Patent
Gopalakrishnan et al.

(10) Patent No.: US 12,368,933 B1
(45) Date of Patent: Jul. 22, 2025

(54) ENHANCED STREAMING VIDEO ADVERTISEMENT INTEGRATION

(71) Applicant: Amazon Technologies, Inc., Seattle, WA (US)

(72) Inventors: Anirudh Gopalakrishnan, Milpitas, CA (US); Arindam Bhattacharya, Fremont, CA (US); Lionel Bitoun, Palo Alto, CA (US); Scott Anthony Siegler, Redwood City, CA (US); Nitesh K. Phatnani, Los Altos, CA (US); Arpitkumar Shah, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 888 days.

(21) Appl. No.: 17/483,066

(22) Filed: Sep. 23, 2021

(51) Int. Cl.
*G06Q 30/02* (2023.01)
*G06Q 30/0251* (2023.01)
*G06Q 30/0272* (2023.01)
*G06Q 30/0273* (2023.01)
*H04N 21/81* (2011.01)
*H04N 21/83* (2011.01)

(52) U.S. Cl.
CPC ....... *H04N 21/812* (2013.01); *G06Q 30/0254* (2013.01); *G06Q 30/0272* (2013.01); *G06Q 30/0275* (2013.01); *H04N 21/83* (2013.01)

(58) Field of Classification Search
USPC .......................................................... 705/14
See application file for complete search history.

(56) References Cited

U.S. PATENT DOCUMENTS

| 10,045,053 B1* | 8/2018 | Wu ................. H04N 21/25808 |
| 10,706,118 B1* | 7/2020 | Yang ................. H04N 21/4667 |
| 10,924,778 B1* | 2/2021 | Shivapurkar .... H04N 21/26258 |
| 2006/0224445 A1* | 10/2006 | Axe ....................... G06Q 30/02 |
| | | 705/14.69 |
| 2008/0270223 A1* | 10/2008 | Collins .............. G06Q 30/0256 |
| | | 705/14.42 |
| 2009/0265737 A1* | 10/2009 | Issa ..................... H04N 21/4331 |
| | | 725/38 |

(Continued)

OTHER PUBLICATIONS

Development of Display Ads Retrieval System to Match Publisher's Contents (Year: 2013).*
Cloud-Based Content Delivery and Streaming (Year: 2014).*

*Primary Examiner* — Vincent M Cao
(74) *Attorney, Agent, or Firm* — Eversheds Sutherland (US) LLP

(57) ABSTRACT

Devices, systems, and methods are provided for enhanced streaming video advertisement integration. A method may include receiving, by a first device, from a second device, a request for advertisement opportunities for a streaming video title; identifying, by the first device, a first advertisement bid for a first advertisement; identifying, by the first device, a second advertisement bid for a second advertisement; sending, by the first device, in response to the request for advertisement opportunities, the first advertisement bid and the second advertisement bid to the second device; sending, by the second device, a request for advertisements to an advertisement server, including the first advertisement bid and the second advertisement bid; receiving, by the second device, a first group of advertisements for a first advertisement opportunity and a second group of advertisements for a second advertisement opportunity of the advertisement opportunities.

20 Claims, 7 Drawing Sheets

(56) References Cited

U.S. PATENT DOCUMENTS

| | | | |
|---|---|---|---|
| 2010/0037248 A1* | 2/2010 | Lo | H04N 21/41407 725/1 |
| 2010/0145809 A1* | 6/2010 | Knapp | G06Q 30/08 705/14.71 |
| 2011/0295683 A1* | 12/2011 | Mak | G06Q 30/0251 705/14.49 |
| 2011/0313857 A1* | 12/2011 | Nice | G06Q 30/02 705/14.66 |
| 2012/0179543 A1* | 7/2012 | Luo | G06Q 30/0256 705/14.54 |
| 2012/0271691 A1* | 10/2012 | Hammad | G06Q 30/02 705/14.17 |
| 2013/0159113 A1* | 6/2013 | McClelland | G06Q 30/02 709/204 |
| 2013/0268431 A1* | 10/2013 | Mohsenzadeh | G06Q 30/0253 705/39 |
| 2014/0351020 A1* | 11/2014 | Kimelfeld | G06Q 30/0201 705/7.35 |
| 2015/0019331 A1* | 1/2015 | Chambard | G06Q 30/0255 705/14.53 |
| 2016/0140618 A1* | 5/2016 | Duggal | G06Q 30/0269 705/14.66 |
| 2016/0148276 A1* | 5/2016 | O'Kelley | G06Q 30/0243 705/14.42 |
| 2016/0295299 A1* | 10/2016 | Kang | H04N 21/458 |
| 2017/0061495 A1* | 3/2017 | Lidow | G06Q 30/0275 |
| 2017/0161774 A1* | 6/2017 | Gorsline | G06Q 30/0269 |
| 2019/0066168 A1* | 2/2019 | Bayer | H04N 21/2665 |
| 2019/0095949 A1* | 3/2019 | Chien | G06Q 30/0275 |
| 2021/0090126 A1* | 3/2021 | Schobeiri | G06Q 30/0269 |
| 2021/0350418 A1* | 11/2021 | Kneen | G06Q 30/0275 |

* cited by examiner

ENHANCED STREAMING VIDEO ADVERTISEMENT INTEGRATION

BACKGROUND

Broadcasters/publishers of television devices often use tag-based advertisements with tags pointing to an endpoint provided by an advertisement provider, and relying on an advertisement server responsible for managing demand sources for a broadcaster/publisher. Advertisement servers identify available advertisement opportunities in video streams and make a decision to invoke various demand sources. Not having a direct integration with the broadcaster/publisher presents significant risks to an advertisement provider, and the current advertisement bid process limits advertisement bidding.

Figure 1A:
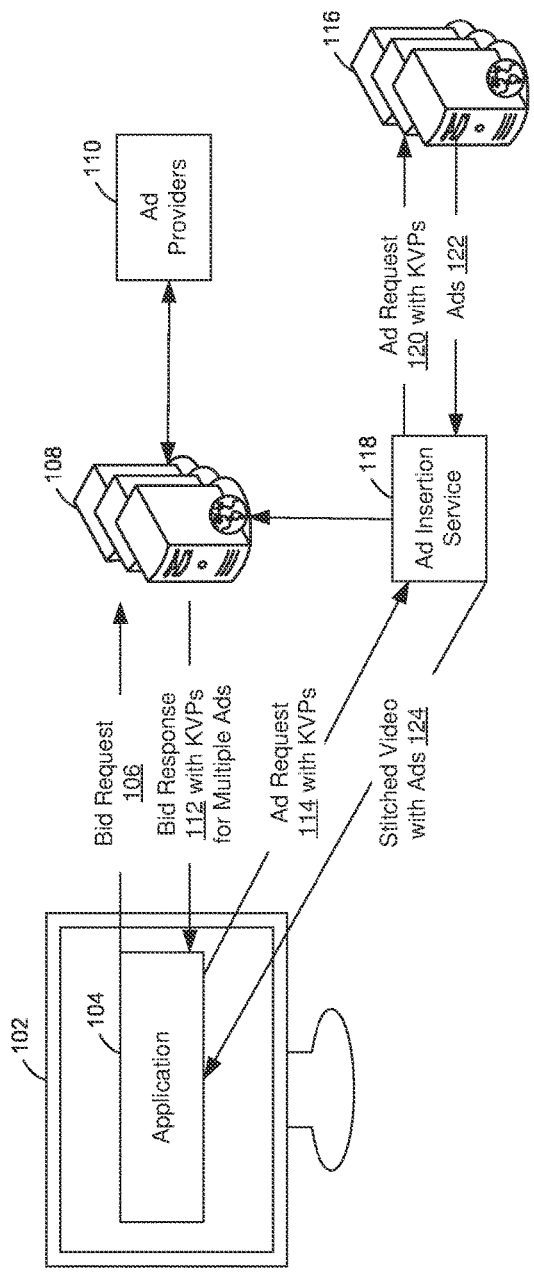
FIG. 1A illustrates an example system for streaming video advertisement integration, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for streaming video advertisement integration.

In some tag-based advertisements, a broadcaster/publisher of a connected-television/mobile application may make a bid request to an advertisement provider, identifying an ad opportunity, and enabling the advertisement provider to respond with a bid on the available advertisement inventory. Currently, a bid in response to a bid request may include a bid on a single advertisement opportunity identified by the bid request.

An advertisement server may be responsible for handling technical contracts such as targeting, connecting to other demand sources and business contracts/constraints such as competitive separation, direct-sold, private-marketplace contracts (e.g., campaign management), yield optimization, advertisement diversity rules, advertisement exclusion rules, etc. The advertisement server in some standard advertisement call flows often has the "first-look" at the available advertisement opportunities in the video streams, and makes a decision to invoke various demand sources. In particular, the advertisement server may use a tag in a bid response to identify content, rank bids when there are multiple, and select advertisements based on frequency considerations, advertisement diversity and exclusion rules, etc. In this manner, advertisement providers who bid on advertisement opportunities may lack direct integration with a broadcaster, which may result in an advertisement provider being blocked by an advertisement server.

With an increase in streaming video use, over-the-top (OTT) advertising has become more popular because it allows for ads to be directly delivered to viewers using streaming video. However, OTT advertising currently lacks the direct integration between advertisement providers and the broadcaster, and lacks the ability to bid on more than one advertisement opportunity at a time. In particular, when an advertisement provider receives a bid request and submits a bid in response, until the advertisement provider receives an advertisement impression, the advertisement provider may not know if the advertisement was presented. Accordingly, an advertisement provider may be requested to bid on an advertisement opportunity without knowing whether a previously submitted bid was accepted, and therefore may have to decide whether to bid on a subsequent request without knowing the effect on any rules or restrictions governing the use of an advertisement.

There is therefore a need for enhanced streaming video advertisement integration.

In one or more embodiments, the present disclosure provides a framework to place multiple advertisement bids, in response to a single advertisement bid request, to render advertisements into multiple available advertisement opportunities in a video stream (e.g., OTT advertising), while honoring the business contracts between a broadcaster and an advertisement provider. An advertisement provider may determine advertisement placements, which may be entities with targeting criteria per the initial business contracts on the broadcaster's advertisement network. In particular, advertisement providers may integrate with an advertisement service (e.g., using an application programming interface-API) and may establish bids based on previously agreed upon advertisement prices. Before a publisher (e.g., an application on a device having a media player) calls an advertisement server to request advertisements to be presented in a video stream, the publisher may call an advertisement service (e.g., an advertisement exchange) for all available advertisement opportunities during long-form video content (e.g., a video title) having one or more advertisement breaks. Because the advertisement service may have established agreements with advertisement providers, and because the advertisement server may have the agreements, the advertisement service may respond to the publisher's bid request by providing bids received from the advertisement providers, allowing the broadcaster to include the bids in a request for advertisements to the advertisement server. In this manner, the publisher may have a more direct integration with the advertisement providers than existing systems allow, and the publisher's requests to the advertisement server may respect agreements in place with the advertisement providers. By providing information with regard to multiple advertisements in response to a single bid request, such as time durations and categories of advertisements, such information may be included in a request for advertisements, allowing for improved integration with broadcasters/publishers while adhering to agreements with advertisement providers.

In one or more embodiments, the broadcaster/publisher may make a bid request call (e.g., request) to an advertisement service prior to calling an advertisement server for advertisements to be rendered in a video-stream presented by the broadcaster. The bid request call may be a single http(s) network call to an advertisement service, for example, allowing the advertisement service to respond with zero or more pre-fetched (e.g., prior to the advertisement request) bids in the form of a collection of key-value (KV) pairs on the available advertisement inventory based on contextual and/or behavioral targeting parameters. The bid request may identify a content length, for example. The bids may be submitted by advertisement providers, identifying a particular advertisement, the advertisement's length, genre or rating restrictions on use, specific advertisement opportunities, and the like. When using open auction bids, the bids may include the bid amount. In other situations, the bids may include an identifier that maps to a bid amount. In this manner, the advertisement service may respond to a single advertisement bid request from the broadcaster by sending multiple bids in response to the bid request, allowing for the broadcaster to include bids on multiple advertisement opportunities when requesting advertisements from an advertisement server.

In one or more embodiments, a bid request call may include an indication of the content length (e.g., the length of a video title before, during, or after which an ad is to be presented), and when an advertisement opportunity occurs relative to the video title (e.g., before, during, which particular portion of the video title, after, etc.). The bid request may indicate a number of advertisements per advertisement break, a content identifier (e.g., to identify the video title), a type identifier (e.g., to identify the type of the video title), a rating of the video title (e.g., PG, TV-14, PG-13, etc.), and a genre of the video title (e.g., action, drama, horror, etc.) to allow advertisement providers to determine on which advertisement opportunities to bid, and how much to bid. For example, based on the specific video title, the genre, rating, time during the video title when the advertisement occurs, and the like, the advertisement service may select prefetched bids submitted by advertisement providers. Using agreements established with the advertisement providers, the advertisement service may select bids based on cost (e.g., included in the bid or based in an identifier in the bid that maps to a bid amount), video title, genre, rating, and the like. For example, if an agreement restricts the use of an advertisement to a certain type of content, rating, genre, advertisement opportunity time, etc., the advertisement service may select a bid to present to the broadcaster when the bid is for an advertisement that is allowed to be used for an advertisement opportunity identified in the bid request. The advertisement service may provide the KV pairs of any selected bid to the broadcaster in response to the bid request. Existing systems may lack such information for multiple advertisement bids, including the categories and time durations of multiple advertisements indicated by the KV pairs.

In one or more embodiments, the KV pairs may include encoded strings that enable the advertisement provider to honor business contracts that are established with the broadcaster/publisher. The advertisement service's response to the bid request call may include a mix of one or more bid types that correspond to "purchasing-channels" under which the advertisement provider intends to buy the advertisement opportunity. The KV pairs may include an indication of any advertisement opportunity on which the advertisement provider bids, a bid price for any respective opportunity (e.g., the actual bid amount or an identifier that maps to a bid amount), a category of advertisement (e.g., soft drink, food, apparel, political campaign, television program, video game, etc.), a duration of any advertisement, the specific advertisement breaks on which the advertisement provider is bidding, and requests to not use advertisements for certain genres and/or ratings. Bid responses may include bids on all or a subset of advertisement opportunities identified by a bid request. When an advertisement service receives a bid request and responds to the bid request by providing KV pairs, the device that sent the bid request and receives the KV pairs in response may send an advertisement request to an advertisement server by including the KV pairs in the advertisement request. The KV pairs may activate preset line items in the advertisement server that are configured with price points, categories, and frequency caps which for the application of supply-side business rules when generating groups of advertisements to send to the requesting device for presentation.

In one or more embodiments, the advertisement server analyzes the bid responses and builds advertisement groups based on the bid responses and any rules that may be used in the selection of advertisements (e.g., advertisement use limits and requirements, restrictions on different types of advertisements, etc.). In this manner, rather than an advertisement provider having to respond sequentially to respective advertisement requests, often without knowing whether a previously submitted advertisement bid was accepted, advertisement providers may bid on multiple advertisement opportunities simultaneously and in accordance with any predetermined agreements with an advertisement server. For example, the publishers may set up line items on the advertisement server corresponding to the agreed upon price points, and the advertisement server may apply the agreed upon price points when generating a group of advertisements to send to the broadcaster for presentation.

In one or more embodiments, the present disclosure may allow the publisher/broadcaster to establish a direct relationship with advertisement provider(s) by utilizing targeting features of advertisement servers. The direct relationship may provide benefits such as reducing the dependency on a single decision-making component by reducing the bias towards a set of demand sources, as the advertisement servers may apply rules to block or reduce observed supply to a demand source. There are very few advertisement-servers with a majority of the market share, so they may lack incentive to provide granular auction mechanics data to a customer. The present disclosure enables the first-look advertisement provider to expose granular auction mechanics metrics, better/accurate reach estimation for the advertiser and DSPs (demand side platforms), stronger contextual signals not limited by the features provided by the ad-server, etc.

In one or more embodiments, the broadcaster device with a media player and that requests advertisement may have a software development kit (SDK) for integration, as some code for a publishing service of the media player may be integrated into the operating system of the device. The publishing service also may have a server-side application programming interface (API) for when the publishing service calls from a content management system (CMS) or an advertisement proxy service. The API may allow publishers to retrieve publishing service KV pairs using an system-to-system back-end call, for example, that returns the bid information to be passed to publisher advertisement server.

In one or more embodiments, a publishing service OTT integration may allow publishers to integrate with the publishing service without needing to establish their own server-side infrastructure. Instead, publishers may be allowed to make API calls to a publishing service endpoint directly from applications using a client-to-server API.

In one or more embodiments, original content providers (e.g., from television channels) may distribute their content directly to consumers/viewers through their own OTT applications and also indirectly through virtual multichannel video programming distributors (vMVPDs). The yield for content distributed on vMVPDs may be improved by enabling publishing service integration. Monetization challenges are driven by the large number of vMVPDs and the limited data signals available for targeting. The publishing service may need an address (e.g., Internet Protocol) and device identifier to be passed from the vMVPDs to enable targeting and effective monetization.

In one or more embodiments, the present disclosure may allow for long-form ads (LFAs). LFAs may refer to 45-second and 60-second creatives. LFAs may be limited to an open auction. Publishers may not be able to run private marketplaces or supply guarantees on LFAs, may need to provide a single floor for both 45-second and 60-second creatives, and may not have separate OA floors for 45-second and 60-second creatives. Publishers may need to be added to a safe list so that the LFA pricing is available on a database portal of the publishing service. Duration targeting for publishers may be enabled.

Currently, a publishing service may cache the bids sent back to the ad server for a time period (e.g., four hours time to live). This is because the user could be watching a live video or VOD content, or a movie (e.g., that could be three hours long) and also could pause the video while watching, making the duration even longer. Some publishers call the publishing service break by break, in which case it may not be necessary to cache for hours, but some publishers call and pre-fetch for the entire session or duration, hence the four hour time to live. In one or more embodiments, there may be a more optimized way of caching these bids. One example is to cache for the video content duration plus an additional buffer for the user pausing the video (e.g., 20% or some other number). For this optimization to happen, the video length of the content may need to be provided from the publishers either ahead of time or in the bid request signals to allow for such caching for a dynamic duration versus the old style of fixed duration caching.

In one or more embodiments, the present disclosure may allow for automated allocation for policy and open auction channels. After an ad is presented by a device, the ad service may receive ad impression signals to determine that the ad was presented, and may log the impression. A configuration service may read data at a regular cadence and determine the percentage allocation between guaranteed bids (e.g., higher ranked purchase channel) and open auction bids (e.g., lower ranked purchase channel). All bids may not be allocated to a higher ranked channel because there may an impression target and reasons to distribute delivery evenly. Based on the overall impression target for each customer and the impressions delivered so far (e.g., information is obtained from data logs), the configuration provider may generate a target number of impressions to be delivered for the next hour or some time duration. Using a simple linear regression model, for example, given the parameters of impression target, current allocation percentage to policy and impressions to be delivered, the configuration service may generate a new allocation percentage for each publisher. The new allocation percentage is pushed to an allocation configuration database for real-time ad-serving systems to consume, thereby creating a feedback loop.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1A illustrates an example system 100 for streaming video advertisement integration, in accordance with one or more example embodiments of the present disclosure.

Referring to FIG. 1A, the system 100 may include a device 102 or otherwise accessing an application 104 (e.g., a media player application) that may generate and send a bid request 106 for advertisements bids to an advertisement service 108 that may be remote from the device 102. The application 104 may refer to a publisher. The bid request 106 may be received by the advertisement service 108, and the advertisement service 108 may request and identify received advertisement bids (e.g., received from advertisement providers 110) that satisfy the criteria of the bid request 106 (e.g., based on a genre, rating, day, time, etc. of the video title identified by the bid request 106, indicating when the advertisement opportunities occur for a particular video title). The advertisement service 108 may respond to the bid request 106 by generating and sending a bid response 112 to the application 104. The bid response 112 may include KV pairs (KVPs) for zero or more, possibly including multiple, advertisement bids that indicate a particular advertisement for a bid, the advertisement's length, genre or rating restrictions on advertisement use, specific advertisement opportunities for one or more bids, and the like. In this manner, prior to requesting advertisements, the application 104 may request advertisements bids, possibly for multiple advertisement opportunities, using a single bid request (e.g., the bid request 106) to the advertisement service 108, and the advertisement service 108 may provide KV pairs of multiple bids (e.g., that comply with agreements with the advertisement providers) to the application 104 to include in a request for advertisements.

Still referring to FIG. 1A, the application 104 may generate and send an advertisement request 114 to an advertisement server 116. The advertisement request may include the KV pairs (KVPs) that were included in the bid response 112 received from the advertisement service 108. Because the KVPs in the bid response 112 may be selected by the advertisement service 108 based on agreements with the advertisement providers 110, and because the advertisement server 116 may have the agreements, the advertisement request 114 may identify bids (e.g., using the KVPs) that are compliant with the agreements used by the advertisement server 116 to select groups of advertisements to provide to the application 104. The advertisement request 114 may be received by an advertisement insertion service 118 (e.g., a server-side advertisement insertion service) and sent as a request 120 for advertisements (including the KVPs) to the advertisement server 116. In this manner, the advertisement server 116 may select groups of advertisements 122 to send to the application 104 (e.g., via the advertisement insertion service 118). The advertisement insertion service 118 may stitch the advertisements 122 into a video stream 124 to send to the application 104 for presentation using the device 102.

In one or more embodiments, the bid request 106 may be a single http(s) network call to the advertisement service 108, for example, allowing the advertisement service 108 to respond (e.g., using the bid response 112) with zero or more pre-fetched bids in the form of a collection of key-value (KV) pairs on the available advertisement inventory based on contextual and/or behavioral targeting parameters. The bids may be submitted by the advertisement providers 110, identifying a particular advertisement, the advertisement's length, genre or rating restrictions on use, specific advertisement opportunities, and the like. In this manner, the advertisement service 108 may respond to a single advertisement bid request from the broadcaster by sending multiple bids in response to the bid request 106, allowing for the application 104 to include bids on multiple advertisement opportunities when requesting advertisements from the advertisement server 116.

In one or more embodiments, the bid request 106 may include an indication of the content length (e.g., the length of a video title before, during, or after which an ad is to be presented), and when an advertisement opportunity occurs relative to the video title (e.g., before, during, which particular portion of the video title, after, etc.). The bid request 106 may indicate a number of advertisements per advertisement break, a content identifier (e.g., to identify the video title), a type identifier (e.g., to identify the type of the video title), a rating of the video title (e.g., G. TV-MA, PG-13, etc.), and a genre of the video title (e.g., mystery, thriller, etc.) to allow the advertisement providers 110 to determine on which advertisement opportunities to bid, and how much to bid. For example, based on the specific video title, the genre, rating, time during the video title when the advertisement occurs, and the like, the advertisement service 108 may select pre-fetched bids submitted by the advertisement providers 110. Using agreements established with the advertisement providers 110, the advertisement service 108 may select bids based on cost, video title, genre, rating, and the like. For example, if an agreement restricts the use of an advertisement to a certain type of content, rating, genre, advertisement opportunity time, etc., the advertisement service 108 may select a bid to present to the application 104 when the bid is for an advertisement that is allowed to be used for an advertisement opportunity identified in the bid request 106. The advertisement service 108 may provide the KV pairs of any selected bid to the broadcaster in response to the bid request 106.

In one or more embodiments, the KV pairs may include encoded strings that enable the advertisement provider 110 to honor business contracts. The advertisement service's bid response 112 to the bid request 106 may include a mix of one or more bid types that correspond to "purchasing-channels" under which an advertisement provider intends to buy the advertisement opportunity. The KV pairs may include an indication of any advertisement opportunity on which the advertisement provider bids, a bid price for any respective opportunity, a category of advertisement (e.g., soft drink, food, apparel, political campaign, television program, video game, etc.), a duration of any advertisement, the specific advertisement breaks on which the advertisement provider is bidding, and requests to not use advertisements for certain genres and/or ratings. Bid responses may include bids on all or a subset of advertisement opportunities identified by a bid request 106. When the advertisement service 108 receives the bid request 106 and responds to the bid request 106 by providing KV pairs, the device 102 that sent the bid request 106 and receives the KV pairs in response may send the advertisement request 114 to the advertisement server 116 by including the KV pairs in the advertisement request 114. The KV pairs may activate preset line items in the advertisement server 116 that are configured with price points, categories, and frequency caps which for the application of supply-side business rules when generating groups of the advertisements 122 to send to the device 102 for presentation.

In one or more embodiments, the advertisement server 116 analyzes the KVPs and builds advertisement groups based on the KVPs and any rules that may be used in the selection of advertisements (e.g., advertisement use limits and requirements, restrictions on different types of advertisements, etc.). In this manner, rather than an advertisement provider having to respond sequentially to respective advertisement requests, often without knowing whether a previously submitted advertisement bid was accepted, the advertisement providers 110 may bid on multiple advertisement opportunities simultaneously.

In one or more embodiments, any of the device 102, the advertisement service 108, the advertisement insertion service 118, and/or the advertisement server 116 may include a personal computer (PC), a smart home device, a wearable wireless device (e.g., bracelet, watch, glasses, ring, strap/band, patch, bandage, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, an ultra mobile device (UMD), an ultra mobile PC (UMPC), a mobile internet device (MID), an "origami" device or computing device, a device that supports dynamically composable computing (DCC), a context-aware device, a video device, an audio device, a media player, a smartphone, or the like.

Figure 1B:
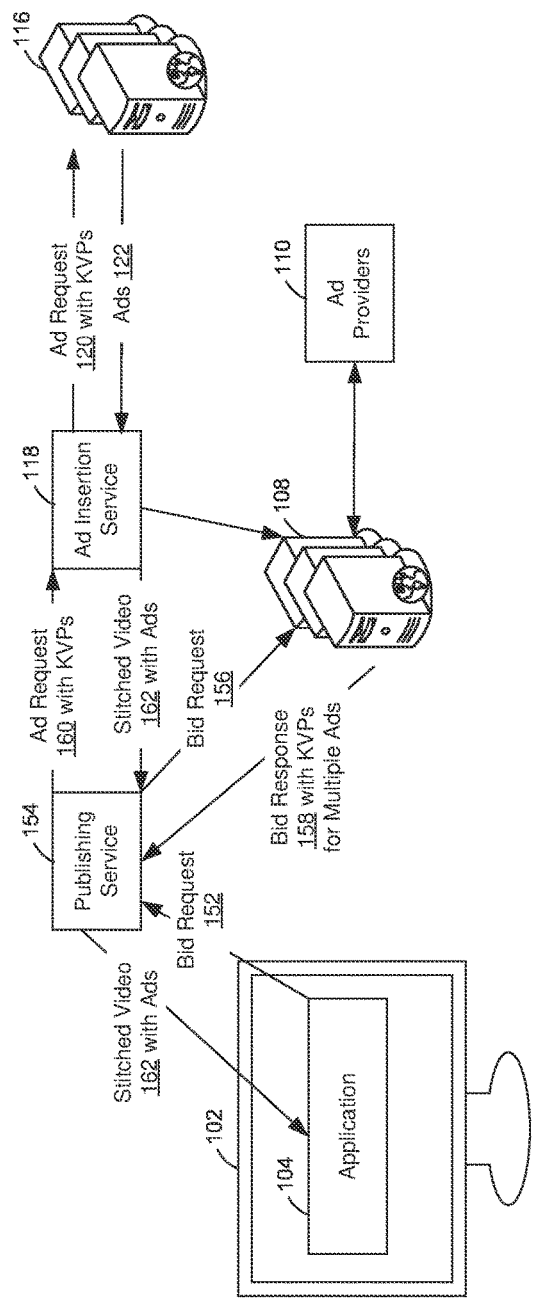
FIG. 1B illustrates an example system for streaming video advertisement integration, in accordance with one or more example embodiments of the present disclosure.

FIG. 1B illustrates an example system 150 for streaming video advertisement integration, in accordance with one or more example embodiments of the present disclosure.

The system 150 in FIG. 1B is similar to the system 100 in FIG. 1A, except that the application 104 may make calls (e.g., a bid request 152) through a proxy, such as a publishing service 154 remote from the device 102. Referring to FIG. 1B, the application 104 may generate and send the bid request 156 (e.g., similar to the bid request 106) for advertisements bids to the publishing service 154, which may send a bid request 156 (e.g., similar to the bid request 106) to the advertisement service 108. The bid request 156 may be received by the advertisement service 108, and the advertisement service 108 may request and identify received advertisement bids (e.g., received from the advertisement providers 110) that satisfy the criteria of the bid request 156 (e.g., based on a genre, rating, day, time, etc. of the video title identified by the bid request 106, indicating when the advertisement opportunities occur for a particular video title). The advertisement service 108 may respond to the bid request 156 by generating and sending a bid response 158 (e.g., similar to the bid response 112) to the application 104. The bid response 158 may include KV pairs (KVPs) for zero or more, possibly including multiple, advertisement bids that indicate a particular advertisement for a bid, the advertisement's length, genre or rating restrictions on advertisement use, specific advertisement opportunities for one or more bids, and the like. In this manner, prior to requesting advertisements, the application 104 may request advertisements bids, possibly for multiple advertisement opportunities, using a single bid request (e.g., the bid request 156) to the advertisement service 108, and the advertisement service 108 may provide multiple bids (e.g., that comply with agreements with the advertisement providers) to the application 104 to include in a request for advertisements.

Still referring to FIG. 1B, the application 104 may generate and send an advertisement request 160 (e.g., similar to the advertisement request 114) to the publishing service 154, which may send the advertisement request 160 to the advertisement insertion service 118, which may send the advertisement request 120 to the advertisement service 116. The advertisement request 120 may include the KV pairs (KVPs) that were included in the bid response 112 received from the advertisement service 108. Because the KVPs in the bid response 158 may be selected by the advertisement service 108 based on agreements with the advertisement providers 110, and because the advertisement server 116 may have the agreements, the advertisement request 120 may identify bids (e.g., using the KVPs) that are compliant with the agreements used by the advertisement server 116 to select groups of advertisements to provide to the application 104. The advertisement request 160 may be received by an advertisement insertion service 118 (e.g., a server-side advertisement insertion service) and sent as the request 120 for advertisements (including the KVPs) to the advertisement server 116. In this manner, the advertisement server 116 may select groups of advertisements 122 to send to the application 104 (e.g., via the advertisement insertion service 118). The advertisement insertion service 118 may stitch the advertisements 122 into a video stream 162 to send to the application 104 for presentation using the device 102.

In one or more embodiments, the bid request 156 may be a single http(s) network call to the advertisement service 108, for example, allowing the advertisement service 108 to respond (e.g., using the bid response 158) with zero or more pre-fetched bids in the form of a collection of key-value (KV) pairs on the available advertisement inventory based on contextual and/or behavioral targeting parameters. The bids may be previously submitted by the advertisement providers 110, identifying a particular advertisement, the advertisement's length, genre or rating restrictions on use, specific advertisement opportunities, and the like. In this manner, the advertisement service 108 may respond to a single advertisement bid request from the broadcaster by sending multiple bids in response to the bid request 156, allowing for the application 104 to include bids on multiple advertisement opportunities when requesting advertisements from the advertisement server 116.

In one or more embodiments, the bid request 156 may include an indication of the content length (e.g., the length of a video title before, during, or after which an ad is to be presented), and when an advertisement opportunity occurs relative to the video title (e.g., before, during, which particular portion of the video title, after, etc.). The bid request 156 may indicate a number of advertisements per advertisement break, a content identifier (e.g., to identify the video title), a type identifier (e.g., to identify the type of the video title), a rating of the video title (e.g., G, TV-MA, PG-13, etc.), and a genre of the video title (e.g., mystery, thriller, etc.) to allow the advertisement providers 110 to determine on which advertisement opportunities to bid, and how much to bid. For example, based on the specific video title, the genre, rating, time during the video title when the advertisement occurs, and the like, the advertisement service 108 may select pre-fetched bids submitted by the advertisement providers 110. Using agreements established with the advertisement providers 110, the advertisement service 108 may select bids based on cost, video title, genre, rating, and the like. For example, if an agreement restricts the use of an advertisement to a certain type of content, rating, genre, advertisement opportunity time, etc., the advertisement service 108 may select a bid to present to the application 104 when the bid is for an advertisement that is allowed to be used for an advertisement opportunity identified in the bid request 156. The advertisement service 108 may provide the KV pairs of any selected bid to the broadcaster in response to the bid request 156.

In one or more embodiments, the KV pairs may include encoded strings that enable the advertisement provider 110 to honor business contracts. The advertisement service's bid response 158 to the bid request 156 may include a mix of one or more bid types that correspond to "purchasing-channels" under which an advertisement provider intends to buy the advertisement opportunity. The KV pairs may include an indication of any advertisement opportunity on which the advertisement provider bids, a bid price for any respective opportunity, a category of advertisement (e.g., soft drink, food, apparel, political campaign, television program, video game, etc.), a duration of any advertisement, the specific advertisement breaks on which the advertisement provider is bidding, and requests to not use advertisements for certain genres and/or ratings. Bid responses may include bids on all or a subset of advertisement opportunities identified by a bid request 156. When the advertisement service 108 receives the bid request 156 and responds to the bid request 156 by providing KV pairs, the device 102 that sent the bid request 156 (e.g., calls the publishing service 154 to send the bid request 156) and receives the KV pairs in response may send the advertisement request 160 to the advertisement server 116 by including the KV pairs in the advertisement request 160. The KV pairs may activate preset line items in the advertisement server 116 that are configured with price points, categories, and frequency caps which for the application of supply-side business rules when generating groups of the advertisements 122 to send to the device 102 for presentation.

In one or more embodiments, the advertisement server 116 analyzes the KVPs and builds advertisement groups based on the KVPs and any rules that may be used in the selection of advertisements (e.g., advertisement use limits and requirements, restrictions on different types of advertisements, etc.). In this manner, rather than an advertisement provider having to respond sequentially to respective advertisement requests, often without knowing whether a previously submitted advertisement bid was accepted, the advertisement providers 110 may bid on multiple advertisement opportunities simultaneously.

In one or more embodiments, any of the device 102, the advertisement service 108, the advertisement insertion service 118, the publishing service 154, and/or the advertisement server 116 may include a personal computer (PC), a smart home device, a wearable wireless device (e.g., bracelet, watch, glasses, ring, strap/band, patch, bandage, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, an ultra mobile device (UMD), an ultra mobile PC (UMPC), a mobile internet device (MID), an "origami" device or computing device, a device that supports dynamically composable computing (DCC), a context-aware device, a video device, an audio device, a media player, a smartphone, or the like.

Figure 2:
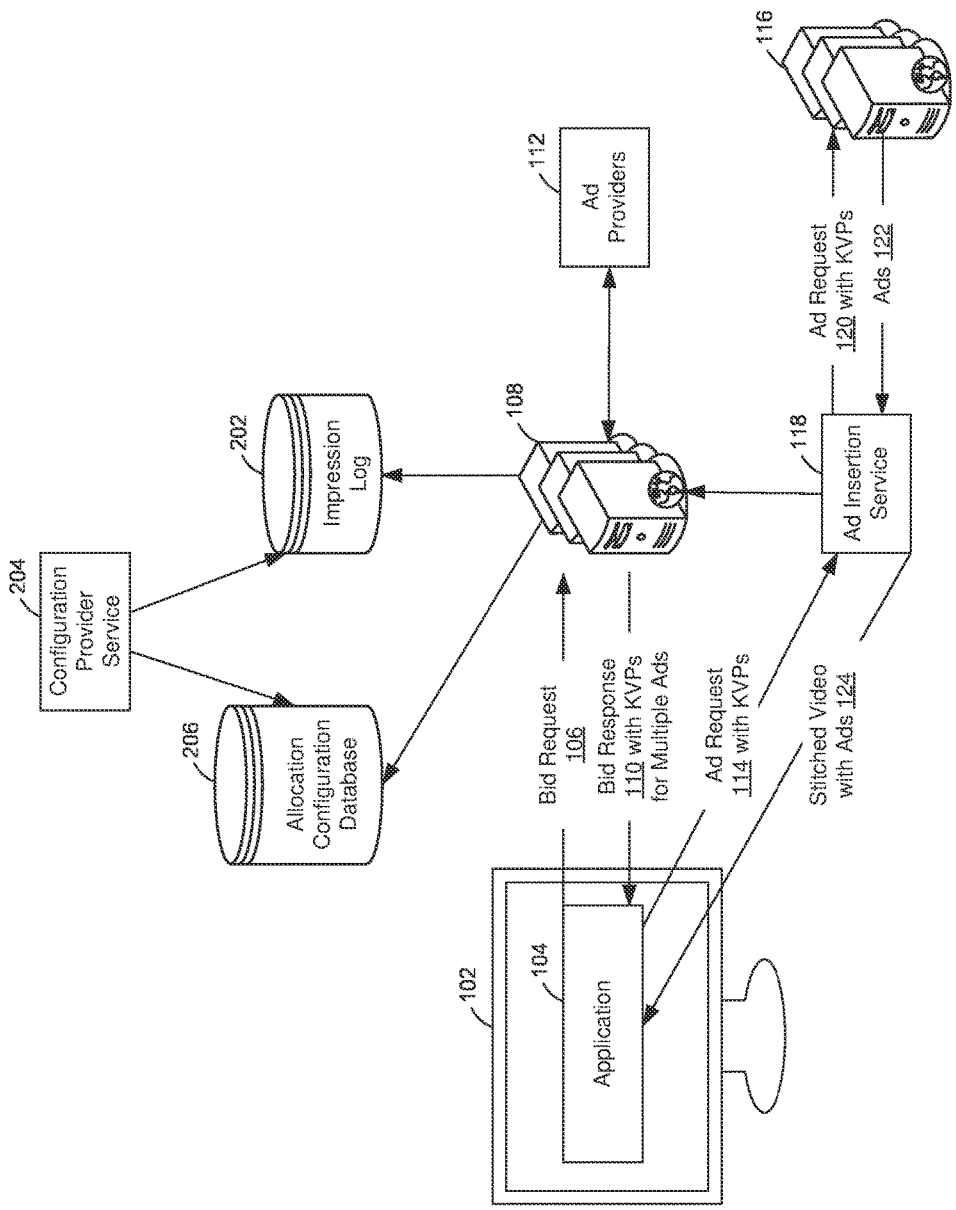
FIG. 2 illustrates an example system for streaming video advertisement integration, in accordance with one or more example embodiments of the present disclosure.

FIG. 2 illustrates an example system 200 for streaming video advertisement integration, in accordance with one or more example embodiments of the present disclosure.

The system 200 is similar to the system 100 and the system 150, and includes a way to log advertisement impressions for automated allocation for policy and open channels.

Referring to FIG. 2, after the stitched video 124 with the advertisements 122 is provided to the device 102, the advertisement insertion service 118 may notify (e.g., call) the advertisement service 108, indicating the serving of the advertisements 122 to the device 102. The advertisement service 108 may log advertisement impressions in an impression log 202, including information about the advertisement publisher, the type of impression, and other attributes. A configuration provider service 204 may read impression data from the impression log 202, and may use the impression data to determine a percentage allocation between guaranteed bids (e.g., based on agreements to use advertisements) and open auction bids selected in generating the groups of advertisements 122. There may be an impression target for an advertisement provider (e.g., based on an agreement). Based on the impression target and the number of impressions that have been delivered for the advertisement provider (e.g., as indicated by the data in the impression log 202), the configuration provider service 204 may generate a target number of impressions to be delivered for an advertisement provider (e.g., within a next hour, day, etc.). Using a linear regression model, based on the impression target, a current allocation percentage of advertisements from an advertisement provider compared to a policy and impressions to be delivered, the configuration provider service 204 may generate a new allocation percentage for any advertisement publisher. The configuration provider service 204 may push the new allocation percentages to an allocation configuration database 206, accessible to real-time advertisement serving systems, thereby creating a feedback loop.

In one or more embodiments, the advertisement service 108, the advertisement insertion service 118, and the configuration provider service 204 may be part of a single system (e.g., cloud-based system) or multiple systems, owned by a common owner. The advertisement server 116 may be owned by the same owner or a different owner. The publishing service 154 may be owned by the same owner or a different owner, and may be included in any system that also includes the advertisement service 108, the advertisement insertion service 118, and/or the configuration provider service 204.

Figure 3:
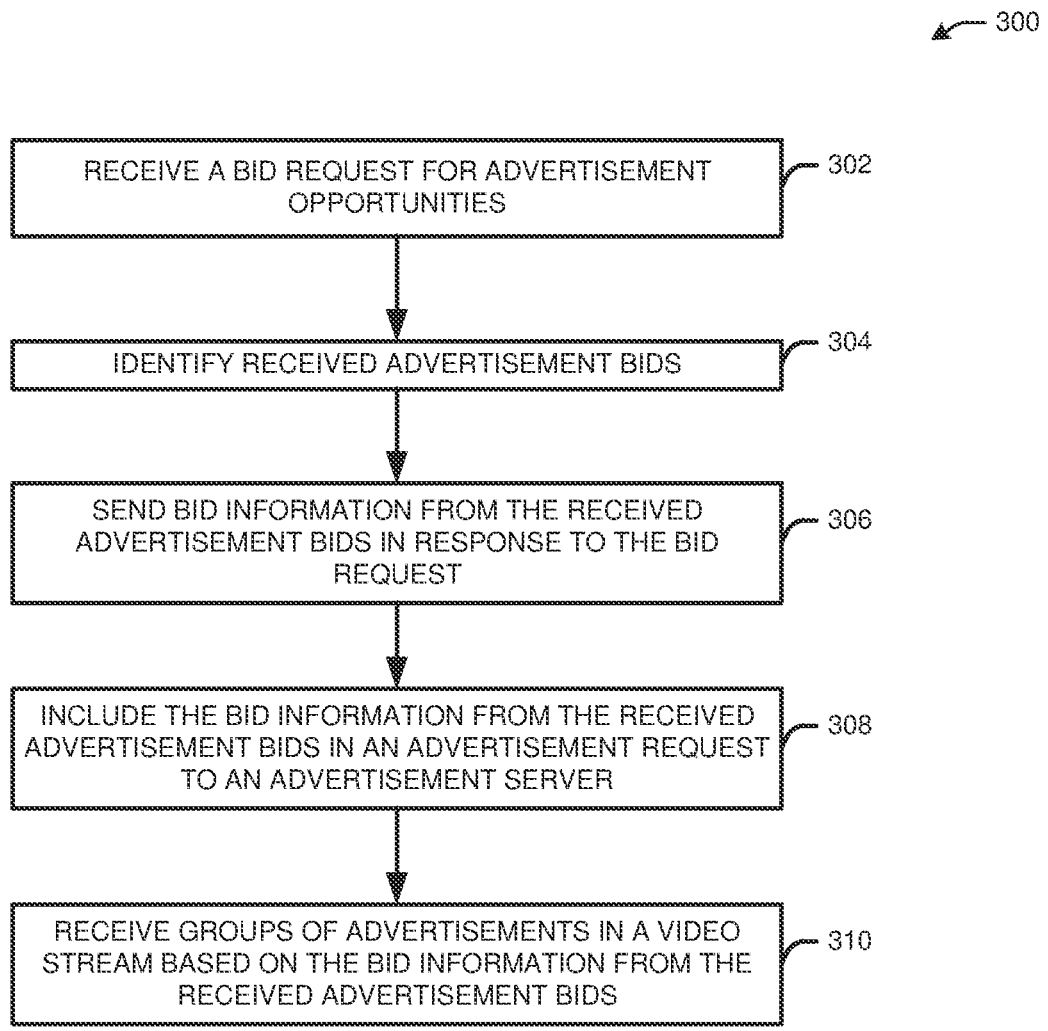
FIG. 3 illustrates a flow diagram for a process for streaming video advertisement integration, in accordance with one or more example embodiments of the present disclosure.

FIG. 3 illustrates a flow diagram for a process 300 for streaming video advertisement integration, in accordance with one or more example embodiments of the present disclosure.

At block 302, a device (or system, e.g., the advertisement service 108 of FIG. 1A) may receive a bid request for advertisement opportunities. The bid request may be a single http(s) network call to an advertisement service, for example, allowing the advertisement service to respond with zero or more pre-fetched (e.g., received prior to the bid request call) bids in the form of a collection of key-value (KV) pairs on the available advertisement inventory based on contextual and/or behavioral targeting parameters. The bids may be submitted by advertisement providers, identifying a particular advertisement, the advertisement's length, genre or rating restrictions on use, specific advertisement opportunities, and the like. In this manner, the advertisement service may respond to a single advertisement bid request from the broadcaster by sending multiple bids in response to the bid request, allowing for the broadcaster to include bids on multiple advertisement opportunities when requesting advertisements from an advertisement server. The bid request may be received from a second device (e.g., the device 102 of FIG. 1) or through a proxy (e.g., the publishing service 154 of FIG. 1B).

At block 304, the device may request and identify received advertisement bids from advertisement providers (e.g., the advertisement providers 110 of FIG. 1A). The bids may be submitted by advertisement providers, identifying a particular advertisement, the time duration of any advertisements, the categories of any advertisements (e.g., food, clothing, etc. identifying the types of products or services being advertised), genre or rating restrictions on use, specific advertisement opportunities, bid amount or an identifier that maps to a bid amount, and the like. The bids may be based on established agreements with advertisement providers, and an advertisement server (e.g., the advertisement server 116 of FIG. 1A) may have access to the agreements.

At block 306, the device may generate and send bid information (e.g., KVPs) from the received advertisement bids to the device from which it received the bid request. In this manner, the advertisement service may respond to a single advertisement bid request from the broadcaster by sending multiple bids in response to the bid request, allowing for the broadcaster to include bids on multiple advertisement opportunities when requesting advertisements from an advertisement server. In one or more embodiments, the KVPs may include encoded strings that enable the advertisement provider to honor business contracts that are established with the broadcaster. The advertisement service's response to the bid request call may include a mix of one or more bid types that correspond to "purchasing-channels" under which the advertisement provider intends to buy the advertisement opportunity. The KVPs may include an indication of any advertisement opportunity on which the advertisement provider bids, a bid price for any respective opportunity, a category of advertisement (e.g., soft drink, food, apparel, political campaign, television program, video game, etc.), a duration of any advertisement, the specific advertisement breaks on which the advertisement provider is bidding, and requests to not use advertisements for certain genres and/or ratings. Bid responses may include bids on all or a subset of advertisement opportunities identified by a bid request.

At block 308, the media player device that sent the bid request (e.g., the device 102 of FIG. 1A) may receive the bid information (e.g., KVPs) from the device, and may use the KVPs to generate and send an advertisement request to the advertisement server. The advertisement request may include the KVPs from the selected bids. The KV pairs may activate preset line items in the advertisement server that are configured with price points, categories, and frequency caps which for the application of supply-side business rules when generating groups of advertisements to send to the requesting device for presentation.

At block 310, the media player device may receive groups of advertisements in a video stream (e.g., OTT advertisements) based on the KVPs from the previously received bids. The advertisement server may receive the advertisement request (e.g., through a server-side service) and may use the KVPs in the request to select advertisements to serve. The selected advertisements may be based on the KVPs and the agreements with advertisement providers. For example, the agreements may define a number of impressions to be delivered to an advertisement provider, so the advertisement server may be obligated to serve an advertisement from a particular advertisement provider. The KVPs may define advertisement bids for particular opportunities, and any restrictions on the use of the advertisements (e.g., based on timing, rating, genre, etc.). This way, the advertisement server may receive the KVPs that are consistent with the agreements, allowing for more direct integration with advertisement providers who provide the information in the KVPs, and reducing the chances that an advertisement provider is blocked by an advertisement server. The media player device may receive and present the video stream, including the served advertisements.

Figure 4:
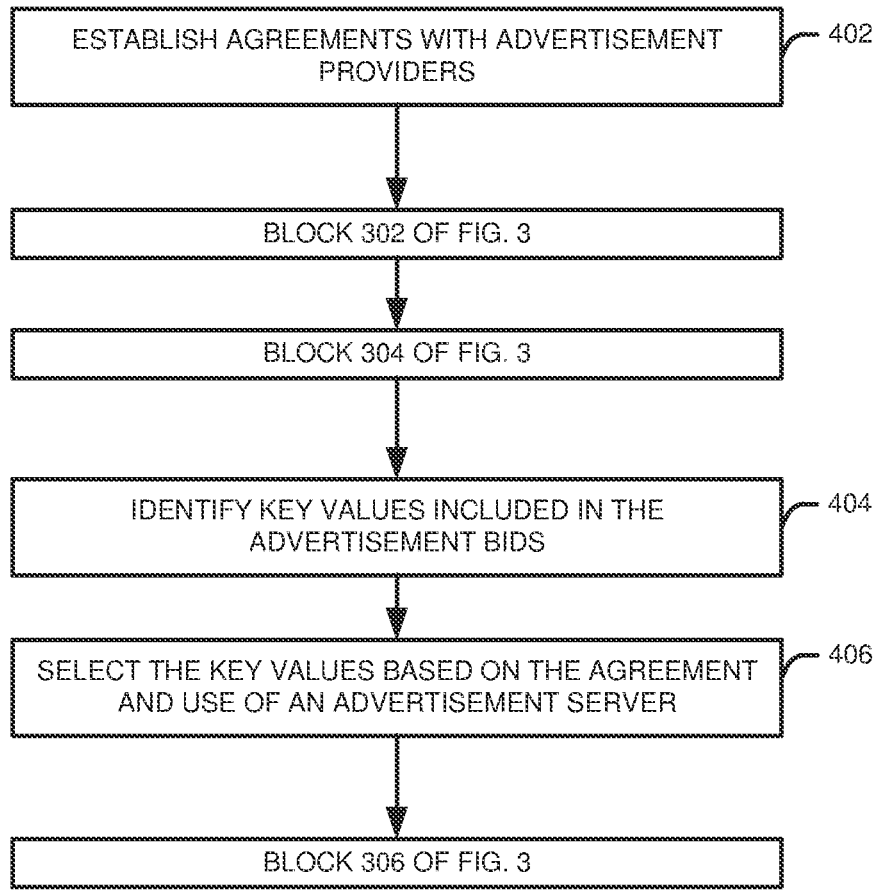
FIG. 4 illustrates a flow diagram for a process for streaming video advertisement integration, in accordance with one or more example embodiments of the present disclosure.

FIG. 4 illustrates a flow diagram for a process 400 for streaming video advertisement integration, in accordance with one or more example embodiments of the present disclosure.

At block 402, a device (or system, e.g., the advertisement service 108 of FIG. 1A) may establish agreements with advertisement providers (e.g., the advertisement providers 110 of FIG. 1A). Because the advertisement service may have established agreements with advertisement providers, and because an advertisement server (e.g., the advertisement server 116 of FIG. 1A) may have the agreements, the bid responses provided by the advertisement service, and therefore the advertisement requests provided by a media player device (e.g., the device 102 of FIG. 1A), may include KVPs that correspond to the agreements, allowing the media player device to include the bids in a request for advertisements to the advertisement server. In this manner, the media player device may have a more direct integration with the advertisement providers than existing systems allow, and the broadcaster's requests to the advertisement server may respect agreements in place with the advertisement providers. The agreements may provide a number of impressions to deliver, a cost per advertisement, restrictions on time of use, genre of a video program, rating of a video program, and the like.

At block 404, the device may identify KVPs included in the advertisement bids received from the advertisement providers. The device may receive (e.g., at block 302 of FIG. 3) a bid request, may (e.g., at block 304 of FIG. 3) receive bids from advertisement providers based on the advertisement opportunities of the bid request, and may analyze the received bids for KVPs that match the criteria in the bid request (e.g., based on particular video program during which an advertisement is to be presented, a time of presentation, a genre, a rating, etc.) and/or any restrictions included in an agreement with an advertisement provider.

At block 406, based on the received bids, the bid request, and the agreements, the device may select the KVPs to return to the requesting media device (e.g., the device 102 of FIG. 1A) so that the requesting media device may include the KVPs in an advertisement request. Because the advertisement service may have established agreements with advertisement providers, and because the advertisement server may have the agreements, the advertisement service may respond to the media player device's bid request by providing bids received from the advertisement providers, allowing the media player device to include the bids in a request for advertisements to the advertisement server. In this manner, the media player device may have a more direct integration with the advertisement providers than existing systems allow, and the media player device's requests to the advertisement server may respect agreements in place with the advertisement providers.

Figure 5:
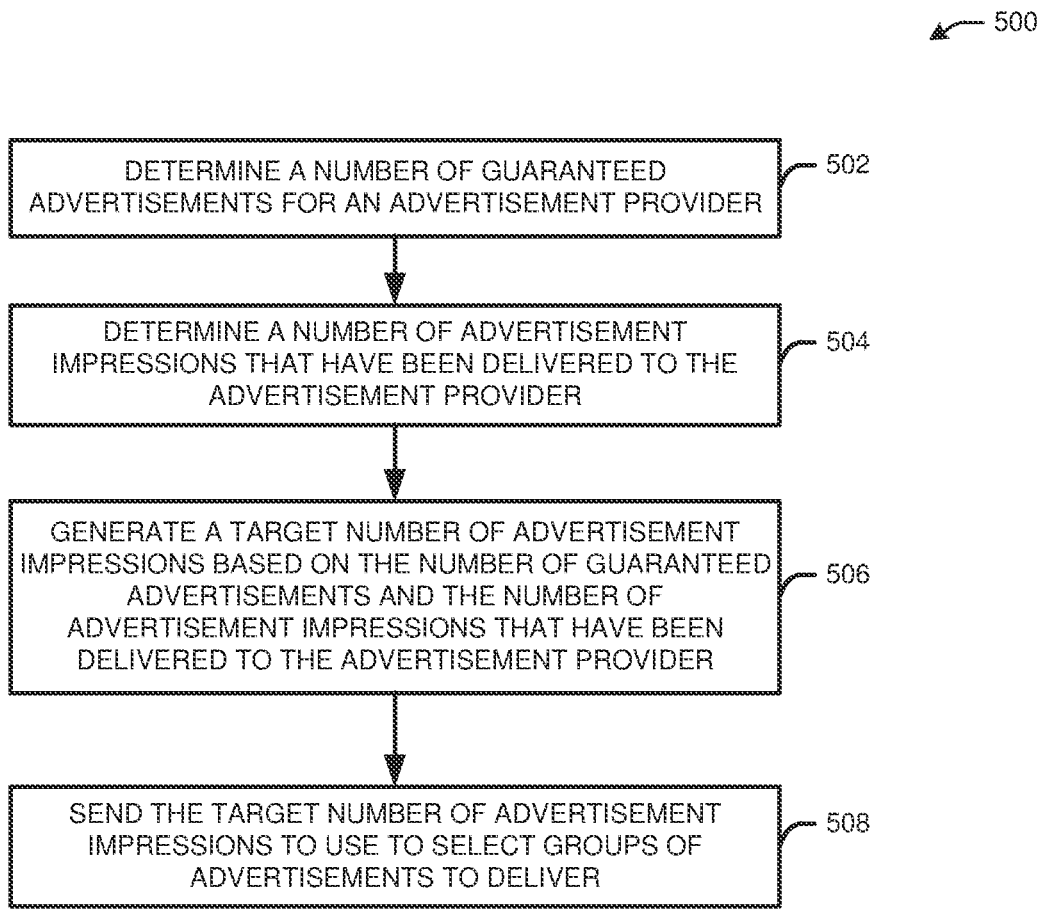
FIG. 5 illustrates a flow diagram for a process for streaming video advertisement integration, in accordance with one or more example embodiments of the present disclosure.

FIG. 5 illustrates a flow diagram for a process 500 for streaming video advertisement integration, in accordance with one or more example embodiments of the present disclosure.

At block 502, a device (or system, e.g., the configuration provider service 204 of FIG. 2) may determine a number of guaranteed advertisements for an advertisement provider (e.g., the advertisement providers 110 of FIG. 1A). The number of guaranteed advertisements may be defined by an agreement (e.g., block 402 of FIG. 4), and may indicate the number of impressions for one or more advertisements provided by an advertisement provider.

At block 504, the device may determine the number of impressions delivered to an advertisement provider so far (e.g., in a given time period). The agreement may define a number of impressions guaranteed to a provider for a price, and when the number of impressions has not yet been met, the device may make such information available for use when selecting KVPs and advertisements.

At block 506, the device may generate a target number of advertisement impressions for an advertisement provider based on the number of guaranteed advertisements and the number of impressions that have been delivered to the provider so far. The target number of advertisement impressions may represent a goal for an upcoming time period (e.g., a next hour). Using a linear regression model, for example, given the impression target, current allocation percentage to policy and impressions to be delivered, the device may generate a new allocation percentage.

At block 508, the device may send the target number of impressions (e.g., to the allocation configuration database 206 of FIG. 2) for real-time advertisement service systems (e.g., the advertisement server 116 of FIG. 1A) to consume and use in the selection of advertisements for presentation.

The descriptions herein are not meant to be limiting.

Figure 6:
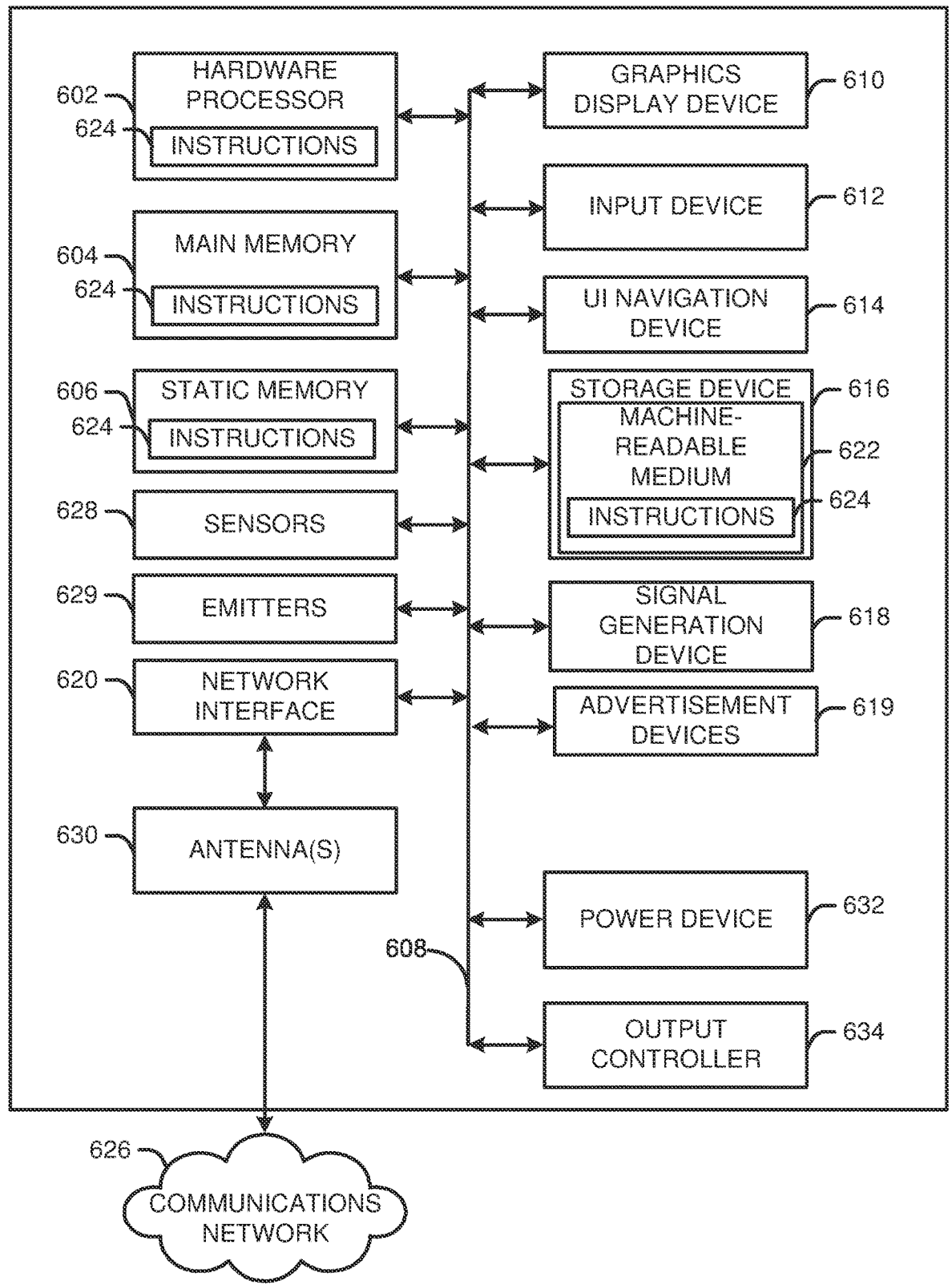
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the device 102 of FIG. 1A, the advertisement service 108 of FIG. 1A, the advertisement insertion service 118 of FIG. 1A, the advertisement server 116 of FIG. 1A, the publishing service 154 of FIG. 1B, the configuration provider service 204 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a client device, a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, one or more advertisement devices 619 (e.g., capable of performing any of the steps of FIGS. 3-5), a network interface device/transceiver 620 coupled to antenna(s) 630, one or more sensors 628. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device." "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating." when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second." "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for video stream advertising, the method comprising:

receiving, by at least one first processor of a first device of an advertisement service between advertisement providers, an advertisement server, and a second device having a media player, from the second device, a request for advertisement opportunities for a streaming video title, wherein the request for advertisement opportunities is associated with facilitating a subsequent request to the advertisement server for advertisements;

determining, by the at least one first processor, a content identifier for the streaming video title;

determining, by the at least one first processor, a parental rating for the streaming video title;

determining, by the at least one first processor, a genre of the streaming video title;

identifying, by the at least one first processor, based on a first agreement between the media player and a first advertisement provider and based on at least one of the content identifier, the parental rating, or the genre, a first advertisement bid comprising first encoded key-values including a first advertisement duration associated with a first advertisement, and a first advertisement category associated with the first advertisement;

identifying, by the at least one first processor, based on a second agreement between the media player and a second advertisement provider and based on at least one of the content identifier, the parental rating, or the genre, a second advertisement bid comprising second encoded key-values including a second advertisement duration associated with a second advertisement, and a second advertisement category associated with the second advertisement;

sending, by the at least one first processor, in response to the request for advertisement opportunities, the first encoded key-values and the second encoded key-values to the second device, wherein the first encoded key-values and the second encoded key-values are pre-fetched prior to the request for advertisement opportunities;

sending, by at least one second processor of the second device, a request for advertisements to the advertisement server, the request for advertisements comprising the first encoded key-values and the second encoded key-values provided by the advertisement service based on the request for advertisement opportunities;

receiving, by the at least one second processor, from the advertisement server and in response to the request for the advertisements, a first group of advertisements for a first advertisement opportunity of the advertisement opportunities; and receiving, by the at least one second processor, from the advertisement server and in response to the request for the advertisements, a second group of advertisements for a second advertisement opportunity of the advertisement opportunities.

2. The method of claim 1, further comprising:

generating, prior to the request for advertisement opportunities, the first agreement, the first agreement defining a first price associated with the first advertisement, wherein the first advertisement bid is based on the first agreement; and generating, prior to the request for advertisement opportunities, the second agreement, the second agreement defining a second price associated with the second advertisement, wherein the second advertisement bid is based on the second agreement.

3. The method of claim 2, further comprising:

selecting the first encoded key-values based on the advertisement server and the first agreement; and selecting the second encoded key-values based on the advertisement server and the second agreement, wherein sending the first encoded key-values and the second encoded key-values is based on the selections of the first encoded key-values and the second encoded key-values.

4. The method of claim 1, wherein the request for advertisement opportunities is received by a publishing service from the second device and forwarded to the first device from the publishing service.

5. A method for video stream advertising, the method comprising:

receiving, by at least one first processor of a first device of an advertisement service between advertisement providers, an advertisement server, and a second device having a media player, from the second device, a request for advertisement opportunities for a streaming video title, wherein the request for advertisement opportunities is associated with facilitating a subsequent request to the advertisement server for advertisements;

identifying, by the at least one first processor, based on a first agreement between the media player and a first advertisement provider, a first advertisement bid for a first advertisement, the first advertisement bid comprising at least one of a first advertisement category or a first advertisement duration of the first advertisement;

identifying, by the at least one first processor, based on a second agreement between the media player and a second advertisement provider, a second advertisement bid for a second advertisement, the second advertisement bid comprising at least one of a second advertisement category or a second advertisement duration of the second advertisement;

sending, by the at least one first processor, in response to the request for advertisement opportunities, the first advertisement bid and the second advertisement bid to the second device;

sending, by at least one second processor of the second device, a request for advertisements to the advertisement server, the request for advertisements comprising the first advertisement bid and the second advertisement bid, wherein the first advertisement bid and the second advertisement bid are pre-fetched prior to the request for advertisement opportunities;

receiving, by the at least one second processor, from the advertisement server and in response to the request for the advertisements, a first group of advertisements for a first advertisement opportunity of the advertisement opportunities; and receiving, by the at least one second processor, from the advertisement server and in response to the request for the advertisements, a second group of advertisements for a second advertisement opportunity of the advertisement opportunities.

6. The method of claim 5, further comprising:

identifying, by the at least one first processor, the first advertisement duration in the first advertisement bid, the first advertisement duration associated with the first advertisement opportunity; and identifying, by the at least one first processor, the second advertisement duration in the second advertisement bid, the second advertisement duration associated with the second advertisement opportunity, wherein the first group of advertisements are based on the first advertisement duration, and wherein the second group of advertisements are based on the second advertisement duration.

7. The method of claim 5, further comprising:

identifying, by the at least one first processor, the first advertisement category in the first advertisement bid, the first advertisement category associated with the first advertisement opportunity; and identifying, by the at least one first processor, the second advertisement category in the second advertisement bid, the second advertisement category associated with the second advertisement opportunity, wherein the first group of advertisements are based on the first advertisement category, and wherein the second group of advertisements are based on the second advertisement category.

8. The method of claim 5, further comprising:

determining a number of guaranteed advertisement impressions for a first advertisement provider, wherein the first advertisement bid is received from the first advertisement provider; and determining a number of advertisement impressions that have been delivered for the first advertisement;

generating, based on the number of advertisement impressions that have been delivered for the first advertisement and the number of guaranteed advertisement impressions, a target number of advertisement impressions for the first advertisement; and
sending the target number of advertisement impressions to the advertisement server,
wherein the first group of advertisements is based on the target number of advertisement impressions.

9. The method of claim 5, wherein the request for advertisement opportunities comprises an indication of a content length associated with the streaming video title.

10. The method of claim 5, wherein the advertisement opportunities comprise a third advertisement opportunity for the streaming video title, wherein the first advertisement bid and the second advertisement bid are received from a first advertisement provider, and wherein a third advertisement bid for the third advertisement opportunity is not received from the first advertisement provider.

11. The method of claim 5, further comprising:
generating, prior to the request for advertisement opportunities, the first agreement, the first agreement defining a first price associated with multiple advertisement impressions for the first advertisement, wherein the first advertisement bid is based on the first agreement.

12. The method of claim 5, further comprising:
generating, prior to the request for advertisement opportunities, the first agreement, the first agreement defining a first price associated with one advertisement impression for the first advertisement, wherein the first advertisement bid is based on the first agreement.

13. The method of claim 5, further comprising:
determining, by the at least one first processor, a content identifier for the streaming video title,
wherein identifying the first advertisement bid and identifying the second advertisement bid are based on the content identifier.

14. The method of claim 5, further comprising:
determining, by the at least one first processor, a parental rating for the streaming video title,
wherein identifying the first advertisement bid and identifying the second advertisement bid are based on the parental rating.

15. The method of claim 5, further comprising:
determining, by the at least one first processor, a genre of the streaming video title,
wherein identifying the first advertisement bid and identifying the second advertisement bid are based on the genre.

16. The method of claim 5, further comprising:
identifying first encoded key-values included in the first advertisement bid, the first encoded key-values comprising the at least one of the first advertisement duration or the first advertisement category, and an indication of a first bid amount; and
identifying second encoded key-values included in the second advertisement bid, the second encoded key-values comprising the at least one of the second advertisement duration or the second advertisement category, and an indication of a second bid amount,
wherein sending the first advertisement bid and the second advertisement bid to the second device comprises sending the first encoded key-values and the second encoded key-values, and
wherein sending the request for advertisements comprises sending the first encoded key-values and the second encoded key-values.

17. The method of claim 5, further comprising:
determining a first time during the streaming video title when the first advertisement opportunity occurs and when the first advertisement is to be presented; and
determining a second time during the streaming video title when the second advertisement opportunity occurs and when the second advertisement is to be presented, and
wherein sending the first advertisement bid and the second advertisement bid to the second device comprises sending the first time and the second time.

18. A system comprising:
a first device comprising a media player, and at least one first processor coupled to first memory; and
a second device of an advertisement service between advertisement providers, an advertisement server, and the first device, and comprising at least one second processor coupled to second memory,
wherein the at least one first processor is configured to:
send, to the second device a request for advertisement opportunities for a streaming video title, wherein the request for advertisement opportunities is associated with facilitating a subsequent request to the advertisement server for advertisements;
receive, from the second device, in response to the request for advertisement opportunities, a first advertisement bid and a second advertisement bid; and
send, to an advertisement server, a request for advertisements comprising the first advertisement bid and the second advertisement bid;
receive, from the advertisement server, in response to the request for the advertisements, a first group of advertisements for a first advertisement opportunity of the advertisement opportunities; and
receive, from the advertisement server, in response to the request for the advertisements, a second group of advertisements for a second advertisement opportunity of the advertisement opportunities and
wherein the at least one second processor is configured to:
receive, from the first device, the request for advertisement opportunities;
identify, based on a first agreement between the media player and a first advertisement provider, the first advertisement bid for a first advertisement, the first advertisement bid comprising at least one of a first advertisement duration or a first advertisement category for the first advertisement;
identify, based on a second agreement between the media player and a second advertisement provider, the second advertisement bid for a second advertisement, the second advertisement bid comprising at least one of a second advertisement duration or a second advertisement category for the second advertisement; and
send, in response to the request for advertisement opportunities, the first advertisement bid and the second advertisement bid to the first device, wherein the first advertisement bid and the second advertisement bid are pre-fetched prior to the request for advertisement opportunities.

19. The system of claim 18, wherein the at least one second processor is further configured to:
identify the first advertisement duration in the first advertisement bid, the first advertisement duration associated with the first advertisement opportunity; and
identify the second advertisement duration in the second advertisement bid, the second advertisement duration associated with the second advertisement opportunity, wherein the first group of advertisements are based on the first advertisement duration, and wherein the second group of advertisements are based on the second advertisement duration.

20. The system of claim 18, wherein the at least one second processor is further configured to:

identify the first advertisement category in the first advertisement bid, the first advertisement category associated with the first advertisement opportunity; and identify the second advertisement category in the second advertisement bid, the second advertisement category associated with the second advertisement opportunity, wherein the first group of advertisements are based on the first advertisement category, and wherein the second group of advertisements are based on the second advertisement category.

\* \* \* \* \*